(12) United States Patent
Greenblatt et al.

(10) Patent No.: US 11,708,103 B2
(45) Date of Patent: Jul. 25, 2023

(54) MATERIAL HANDLING CART

(71) Applicant: Marlin Steel Wire Products, LLC, Baltimore, MD (US)

(72) Inventors: Drew A. Greenblatt, Potomac, MD (US); Andrew Montgomery, Laurel, MD (US); Richard Bates, Baltimore, MD (US)

(73) Assignee: MARLIN STEEL WIRE PRODUCTS, LLC, Baltimore, MD (US)

( * ) Notice: Subject to any disclaimer, the term of this patent is extended or adjusted under 35 U.S.C. 154(b) by 628 days.

(21) Appl. No.: 16/739,213

(22) Filed: Jan. 10, 2020

(65) Prior Publication Data
US 2021/0213990 A1 Jul. 15, 2021

(51) Int. Cl.
*B62B 3/16* (2006.01)
*B65G 7/04* (2006.01)
*B62B 5/00* (2006.01)
*B62B 5/06* (2006.01)
*B65G 49/05* (2006.01)

(52) U.S. Cl.
CPC .............. *B62B 3/16* (2013.01); *B62B 5/0096* (2013.01); *B62B 5/06* (2013.01); *B65G 7/04* (2013.01); *B65G 49/05* (2013.01); *B65G 2203/046* (2013.01)

(58) Field of Classification Search
CPC .......... B62B 3/104; B62B 3/102; B62B 3/10; B62B 5/06; B62B 5/0096; B62B 3/16; B65G 49/05; B65G 7/04
USPC .................................................. 280/33.998
See application file for complete search history.

(56) References Cited

U.S. PATENT DOCUMENTS

| | | | | |
|---|---|---|---|---|
| 2,536,561 A | * | 1/1951 | Mickam | B62B 3/104 280/79.6 |
| 4,454,929 A | * | 6/1984 | Wellman | B25H 1/06 269/296 |
| 4,952,114 A | | 8/1990 | Langer | |
| 5,037,118 A | * | 8/1991 | Straube | B62B 1/262 D34/24 |

(Continued)

FOREIGN PATENT DOCUMENTS

| | | | | |
|---|---|---|---|---|
| CN | 201558884 U | * | 8/2010 | |
| CN | 107458445 A | * | 12/2017 | ............. B62B 3/102 |
| CN | 108791425 A | * | 11/2018 | ............... B62B 3/02 |

*Primary Examiner* — James A Shriver, II
*Assistant Examiner* — Hilary L Johns
(74) *Attorney, Agent, or Firm* — Gregory M. Stone; Whiteford, Taylor & Preston LLP

(57) ABSTRACT

A material handling cart is provided, having a frame with wheels and engaging members for supporting a part carried by the cart. Each engaging member has an engaging surface including a material for protecting a corresponding surface of the part from damage. Upper supports are attached to the frame and extend upward to a distal end, and have a height equal to or greater than a height of the part when the part is carried by the cart. Each upper support has an upper stacking coupler at its distal end. Lower stacking couplers are attached to the bottom of the frame. The lower stacking couplers engage upper stacking couplers of a second identical cart, to stack the cart above the second cart. The upper stacking couplers engage lower stacking couplers of a third identical cart, to stack the third material handling cart above the cart.

22 Claims, 17 Drawing Sheets

(56) References Cited

U.S. PATENT DOCUMENTS

| | | | |
|---|---|---|---|
| 5,722,512 A | 3/1998 | Lilja et al. | |
| 6,099,001 A * | 8/2000 | Barresi | B62B 3/10 280/79.6 |
| 6,719,308 B2 * | 4/2004 | Parker | B62B 3/10 280/649 |
| 7,392,993 B1 | 7/2008 | Prohl et al. | |
| 7,708,160 B2 * | 5/2010 | Booth | B65D 25/20 220/666 |
| 7,886,926 B2 * | 2/2011 | Orgeldinger | B65D 21/083 220/4.03 |
| 8,528,754 B2 * | 9/2013 | Noniewicz | B27B 21/00 211/49.1 |
| 9,061,697 B2 * | 6/2015 | Veronie | B62B 5/0086 |
| 9,249,733 B2 | 2/2016 | Hallam et al. | |
| 9,592,845 B2 | 3/2017 | Palma | |
| 10,232,761 B2 * | 3/2019 | Hooper | B62B 3/04 |
| 10,351,151 B1 * | 7/2019 | Nicholls | B62B 3/104 |
| 10,377,404 B1 * | 8/2019 | Walash | B62B 3/10 |
| 10,906,667 B2 | 2/2021 | Kohn et al. | |
| 10,946,985 B2 | 3/2021 | Leonard et al. | |
| 11,404,731 B2 * | 8/2022 | Yang | B02C 17/1855 |
| 2004/0000766 A1 * | 1/2004 | Ekstein | B62B 3/003 280/79.2 |
| 2004/0222222 A1 * | 11/2004 | Parnall | B65D 11/1833 220/6 |
| 2005/0132924 A1 | 6/2005 | Bothun et al. | |
| 2005/0179235 A1 | 8/2005 | Stewart et al. | |
| 2006/0091096 A1 * | 5/2006 | Velez | B62B 3/102 211/60.1 |
| 2006/0231517 A1 | 10/2006 | Bothun et al. | |
| 2007/0158345 A1 * | 7/2007 | Booth | B65D 7/26 220/6 |
| 2009/0194958 A1 * | 8/2009 | Lin | B62B 3/16 280/47.35 |
| 2009/0278326 A1 * | 11/2009 | Rowland | B62D 63/06 410/80 |
| 2012/0318763 A1 * | 12/2012 | Garton | B65D 71/70 211/85.22 |
| 2013/0056962 A1 * | 3/2013 | Liu | B62B 3/022 280/651 |
| 2014/0001722 A1 | 3/2014 | Willey | |
| 2014/0300070 A1 * | 10/2014 | Veronie | B62B 5/0086 280/79.2 |
| 2016/0214634 A1 | 7/2016 | Palma | |
| 2017/0369087 A1 * | 12/2017 | Dyson | B65D 88/12 |
| 2018/0312183 A1 * | 11/2018 | Sanford | B62B 3/009 |
| 2021/0052051 A1 * | 2/2021 | Perez | A45C 13/385 |
| 2021/0213987 A1 | 7/2021 | Greenblatt et al. | |

* cited by examiner

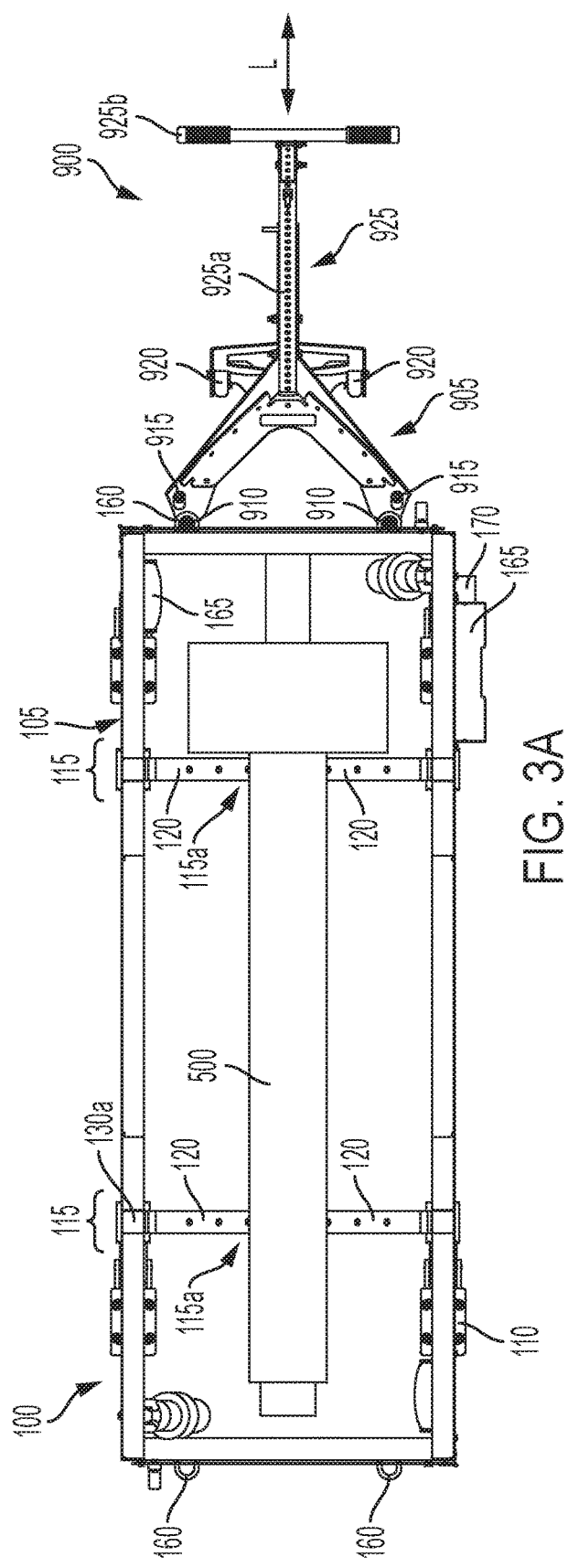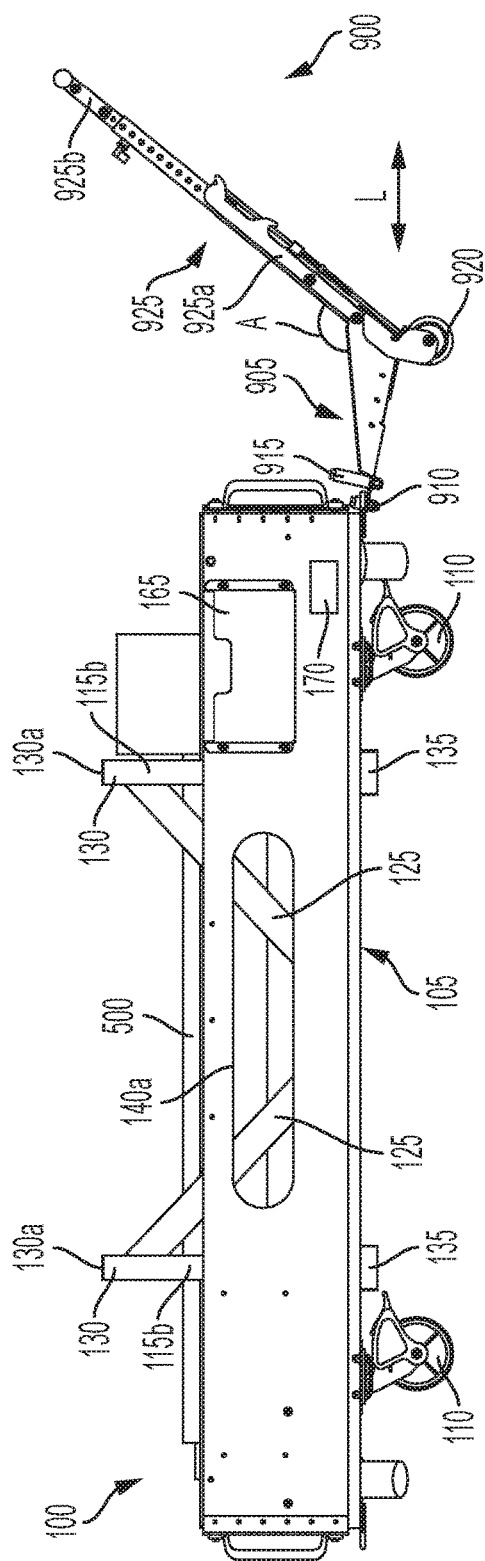
FIG. 3A
FIG. 3B

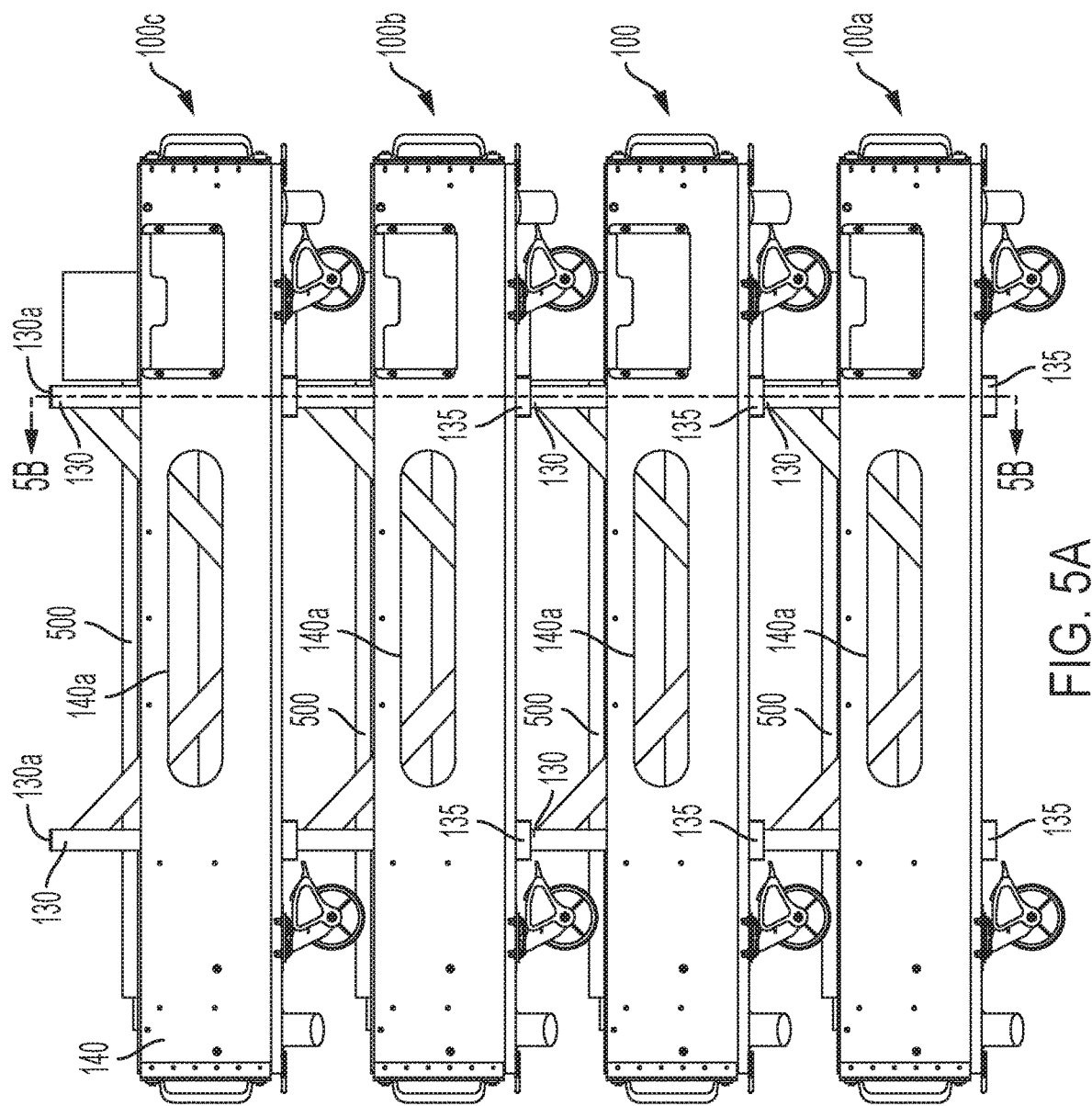

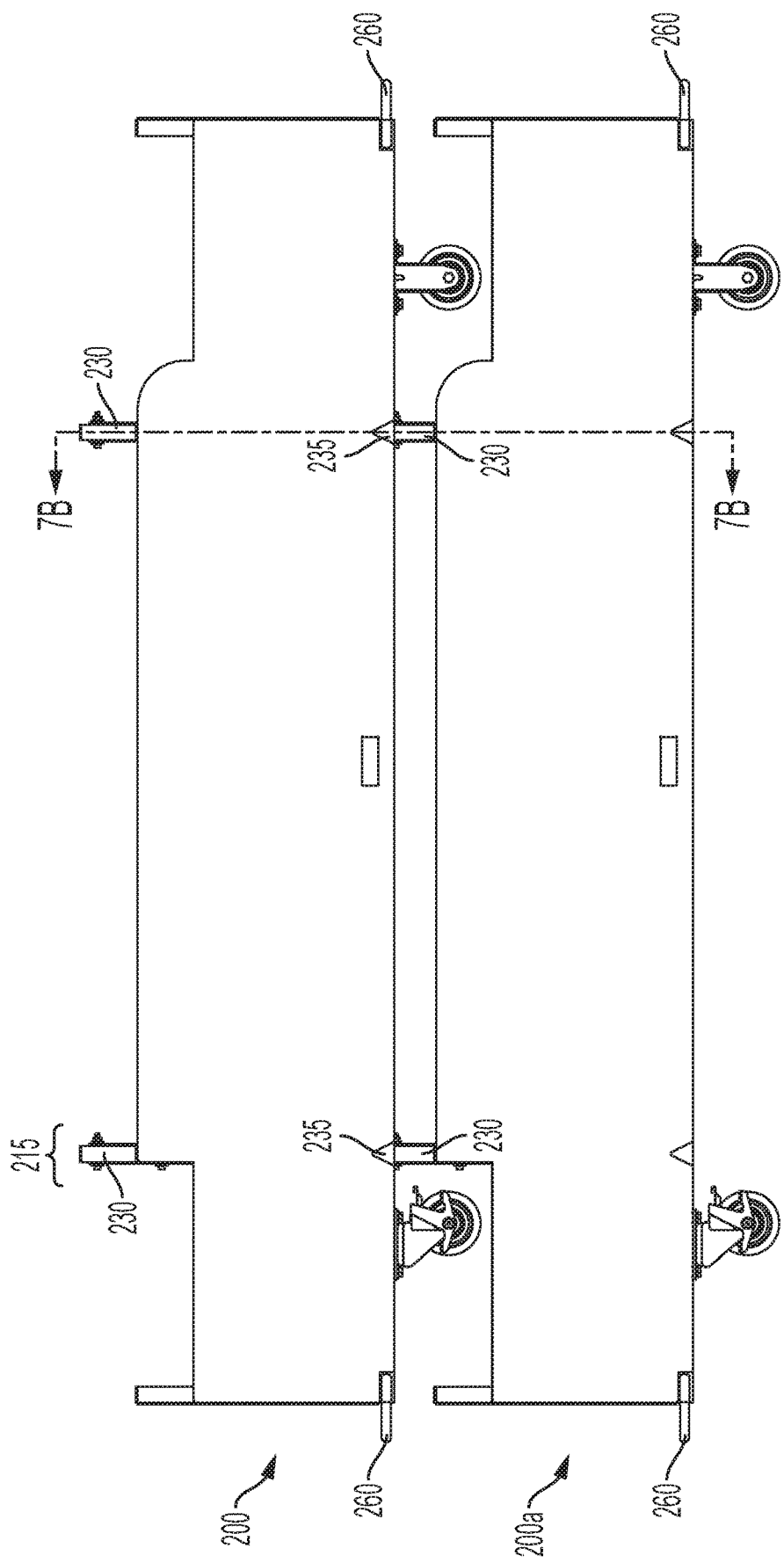

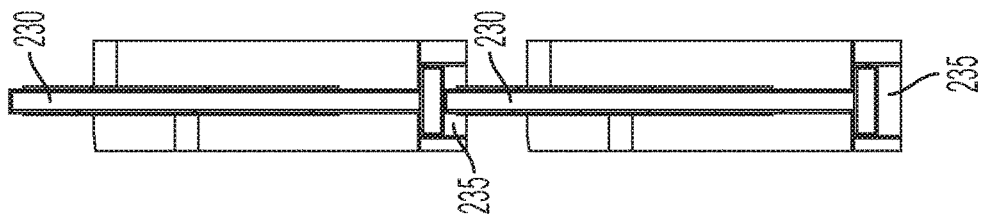
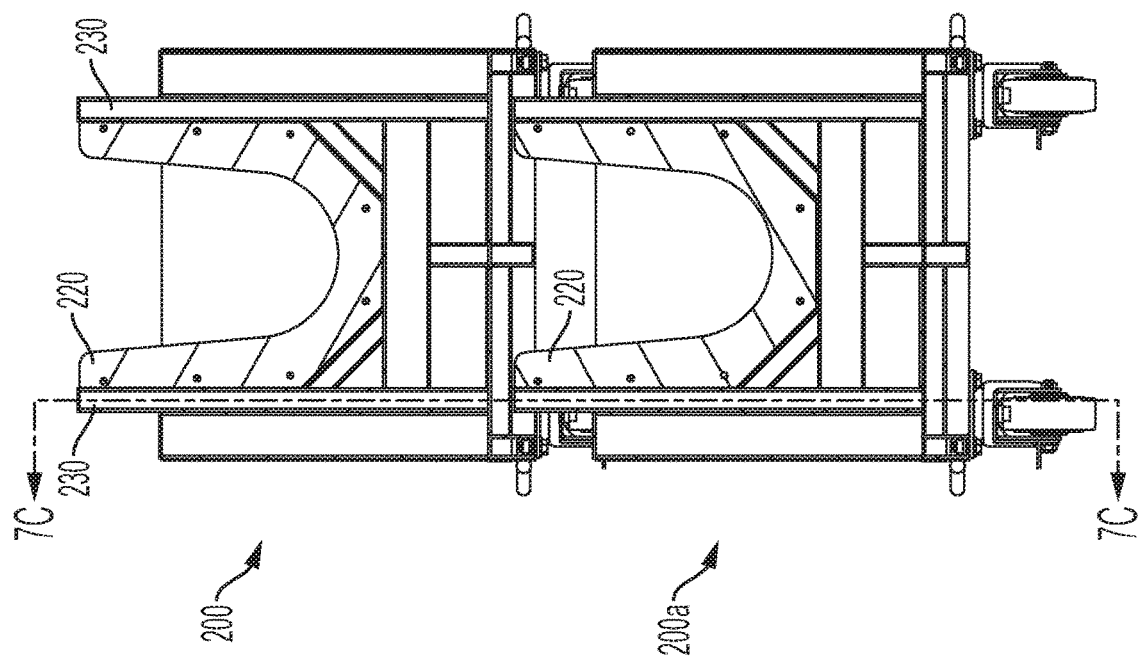

MATERIAL HANDLING CART

TECHNICAL FIELD

The present invention relates to a material handling cart. More particularly, the present invention relates to a cart for handling precision components in a manufacturing, repair, or storage facility.

BACKGROUND

Material handling devices, such as wheeled carts, are widely employed in a variety of industries to transport raw material, parts, components, subassemblies, assemblies, finished products, etc., throughout manufacturing, repair, and storage facilities. Some of these carts are simply wheeled pallets.

Such simple carts have their drawbacks when transporting precision components and assemblies, insofar as they cannot protect machined or polished surfaces from being scratched, dented, and/or otherwise damaged, as by metal-to-metal contact. For example, parts such as shafts with polished bearing journals or other precision machined surfaces can be easily damaged if they contact another shaft, are dropped, are bumped by another cart, etc. These disadvantages are multiplied when many precision parts must be transported within a facility.

There exists a need for a cart to transport precision parts that protects the parts from damage, while facilitating safe movement of a number of such parts.

SUMMARY

Embodiments of the present invention provide a material handling cart comprising a frame including an upper surface and a lower surface. A plurality of wheels are each attached to the lower surface of the frame, and a plurality of engaging members are spaced from each other for supporting a part to be carried by the cart. Each engaging member is attached to the upper surface of the frame, and has an engaging surface for directly engaging the part. The engaging surface comprises a material which protects a corresponding surface of the part from damage when the part is carried by the cart.

The material handling cart further comprises a plurality of upper supports attached to the frame. Each upper support extends upward from the frame to a distal end, and has a height equal to or greater than a height of the part when the part is carried by the cart. Each upper support has an upper stacking coupler at the distal end, and a plurality of lower stacking couplers is attached to the lower surface of the frame. The lower stacking couplers of the cart engage upper stacking couplers of a second material handling cart identical to the cart, to stack the cart above the second cart; and the upper stacking couplers of the cart engage lower stacking couplers of a third material handling cart identical to the cart, to stack the third material handling cart above the cart.

In a further embodiment, one side of the frame of the material handling cart has a pair of spaced-apart first pusher attachments. The cart further comprises a pusher having a base with a proximal end including a pair of second pusher attachments which engage the first pusher attachments to movably attach the pusher base to the cart frame, and a distal end including a pair of wheels mounted to roll along a longitudinal axis of the base when the pusher base is attached to the cart frame. The pusher further comprises a handle extending upward from the distal end of the base at an obtuse angle to the longitudinal axis of the base, such that when the pusher base is attached to the cart frame, a user moves the cart by applying a pushing force on the handle.

BRIEF DESCRIPTION OF THE DRAWINGS

FIGS. 3A and 3B are top and side views, respectively, of the material handling cart depicted in FIG. 1 when it is carrying a part, with a pusher attached.

FIG. 5A is a side view of several examples of the material handling cart depicted in FIG. 1, each carrying a part and stacked on top of each other.

FIG. 7A is a side view of several examples of the material handling cart depicted in FIG. 6A stacked on top of each other.

FIG. 7B is a cross-sectional view taken along line 7B-7B in FIG. 7A.

FIG. 7C is a cross-sectional view taken along line 7C-7C in FIG. 7B.

DETAILED DESCRIPTION

Figure 1:
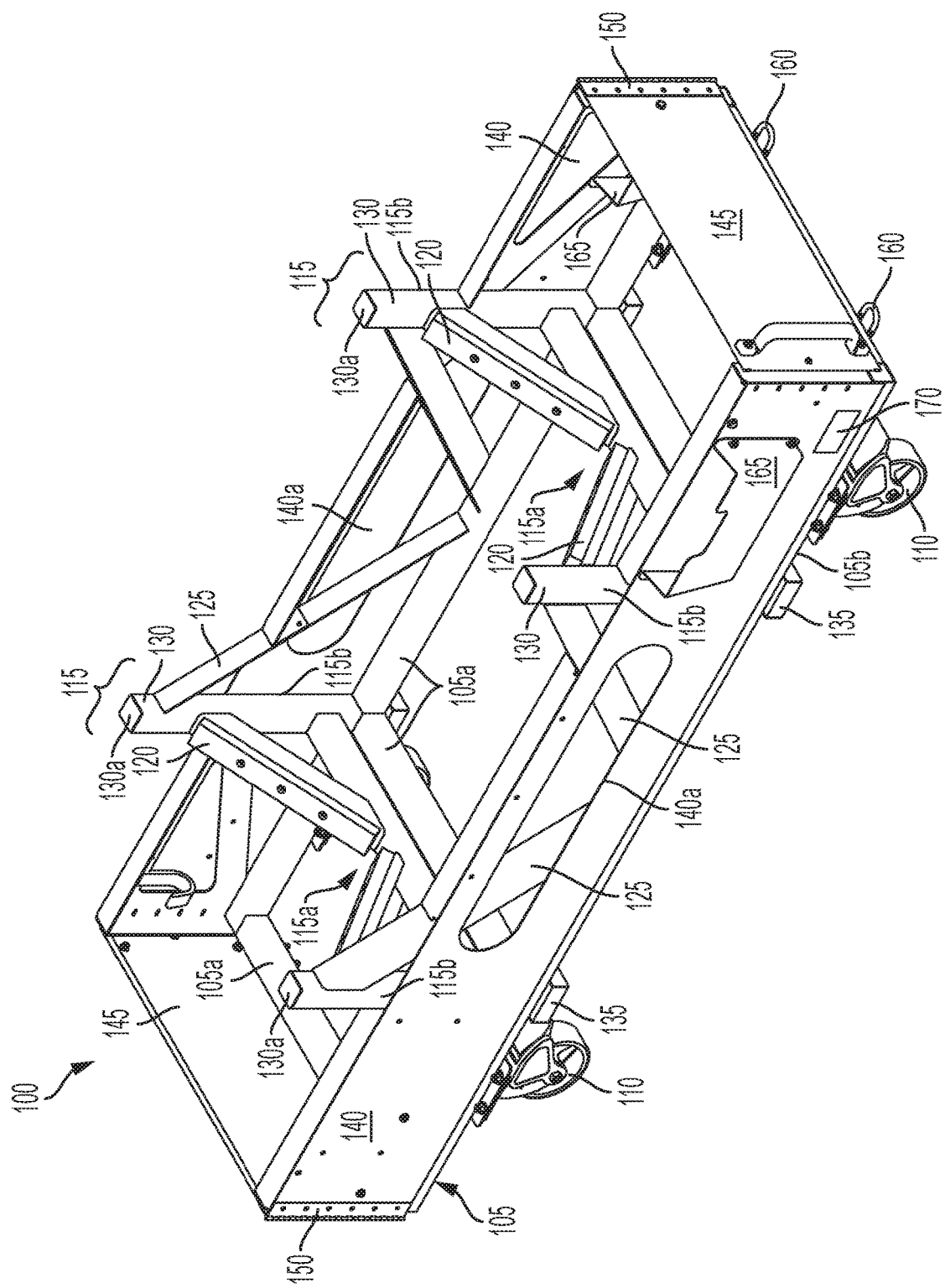
FIG. 1 is a perspective view from above of a material handling cart according to an embodiment of the present disclosure.

The invention will now be described with reference to the drawing figures, in which like reference numerals refer to like parts throughout.

Embodiments of the present disclosure advantageously provide a material handling cart that securely holds delicate and/or precision components and inhibits metal-on-metal contact and other unwanted contact while moving around a manufacturing facility. Additionally, the disclosed material handling device advantageously supports multiple transportation configurations.

Embodiments of material handling carts in accordance with embodiments of the present disclosure will now be described with reference to FIGS. 1-9E. In an embodiment shown in FIGS. 1-5D, a material handling cart 100 for transporting a part such as a shaft 500 has a rectangular shape; for example, about 84 inches by 30 inches, and the shaft 500 weighs approximately 180 pounds. In other embodiments, material handling cart 100 may have different dimensions and shapes, such as a round shape, a square shape, a triangular shape, etc.

Cart 100 of this embodiment comprises a steel frame 105 including an upper surface 105*a* and a lower surface 105*b*, and a plurality of wheels 110, such as conventional caster wheels, each wheel 110 attached to the lower surface 105*b* of the frame 105. Wheels 110 can be swivel caster wheels, each having a lock to prevent motion of the wheel.

Figure 6A:
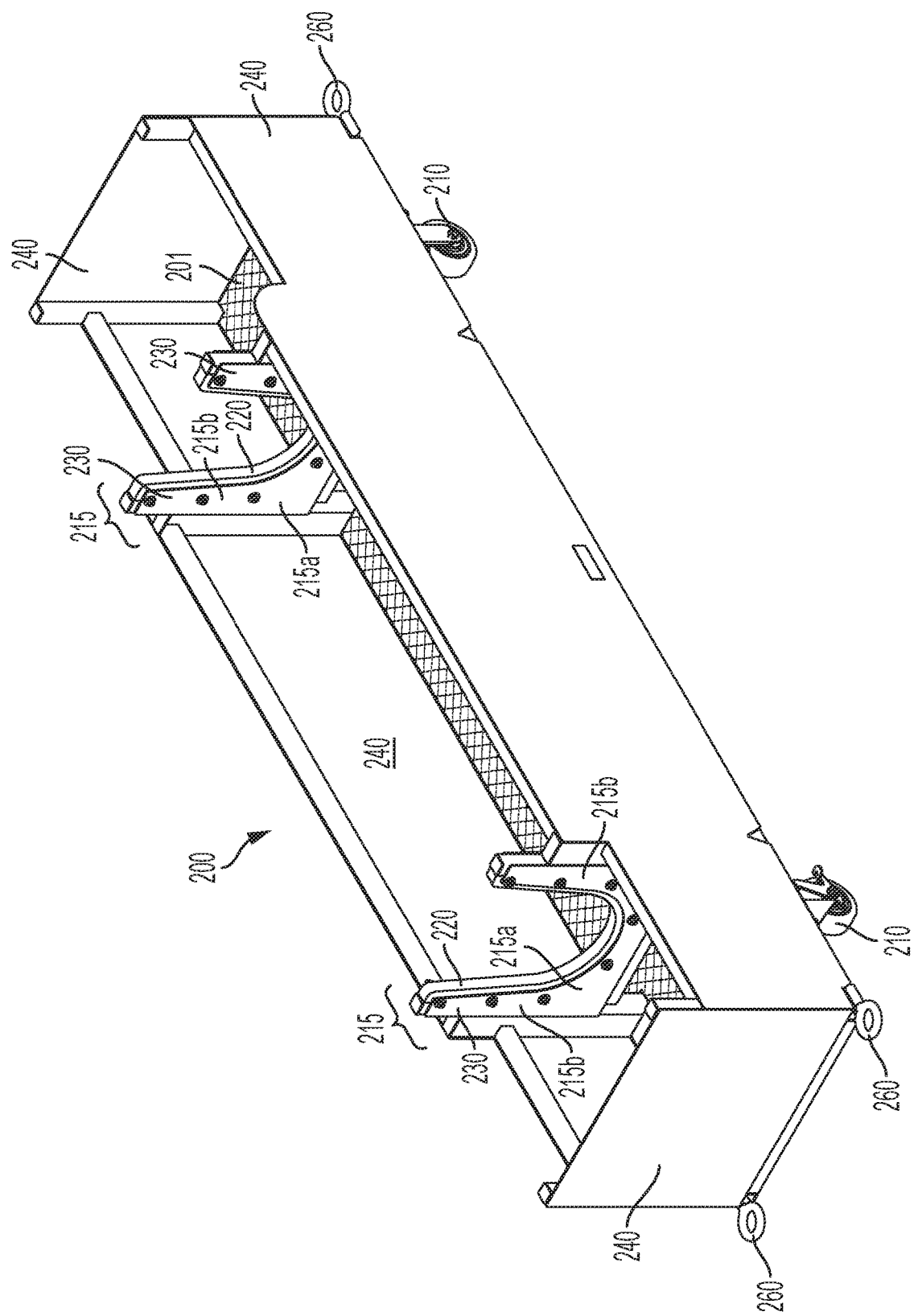
FIG. 6A is a perspective view from above of a material handling cart according to a further embodiment of the present disclosure.
Figure 6B:
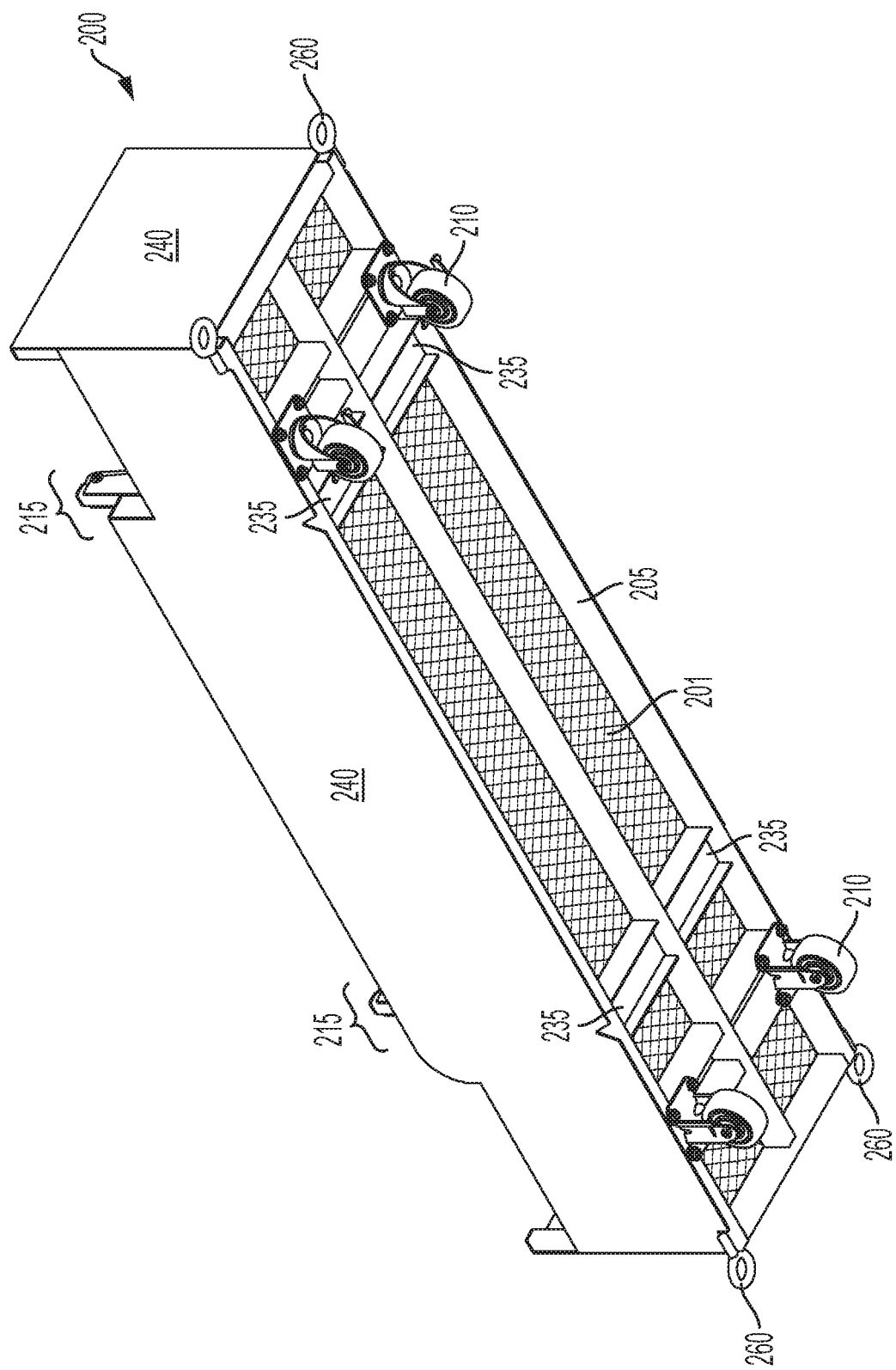
FIG. 6B is a perspective view from below of the material handling cart depicted in FIG. 6A.
Figure 8A:
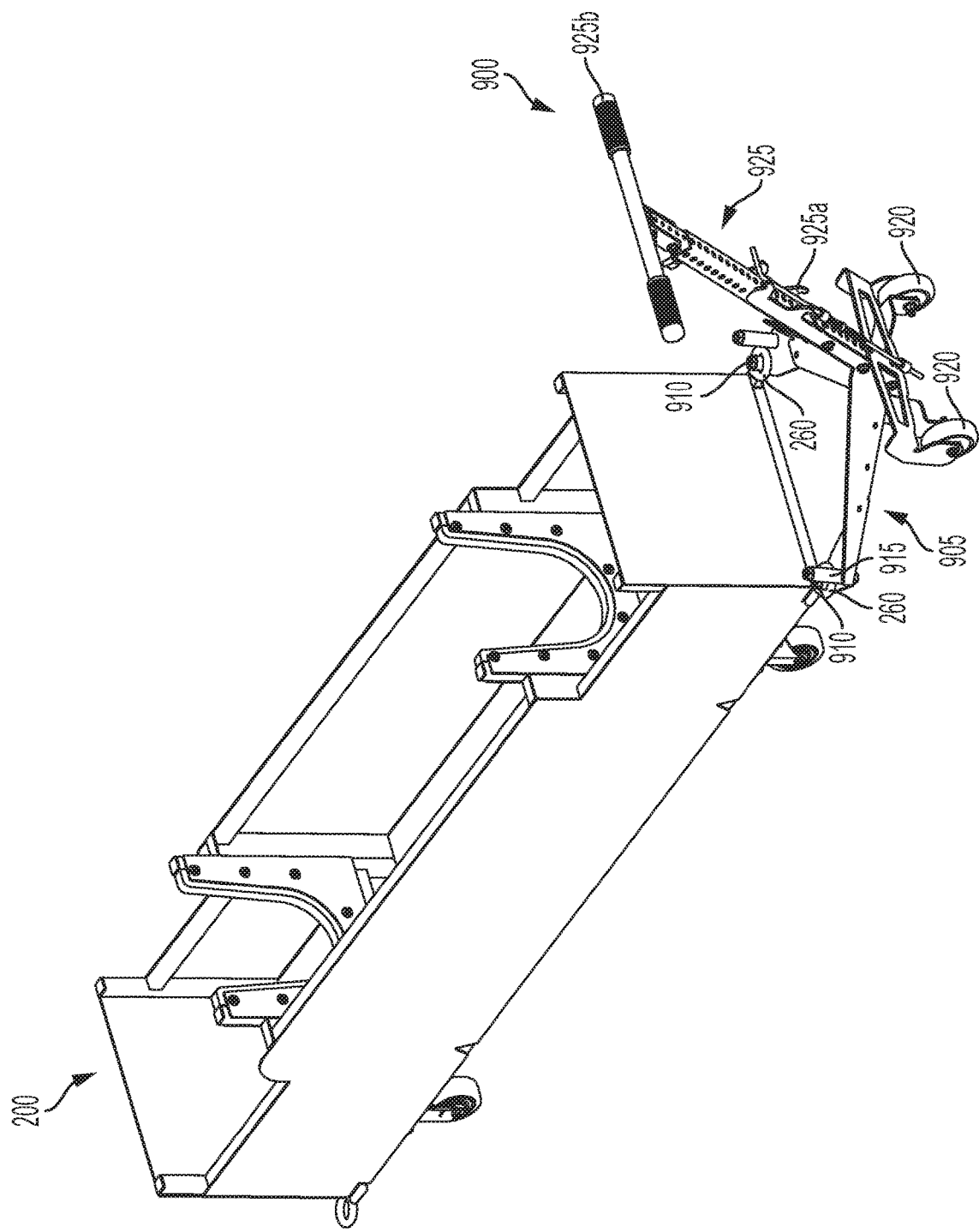
FIG. 8A is a perspective view from above of the material handling cart depicted in FIG. 7A with a pusher attached.
Figure 8B:
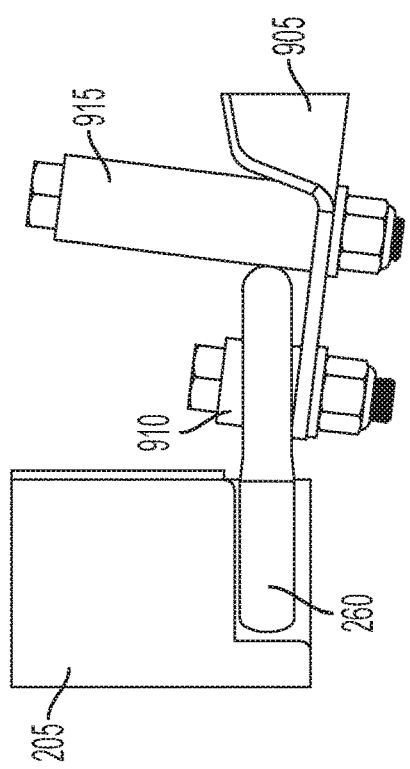
FIG. 8B is a detail view of the connection between the material handling cart and pusher depicted in FIG. 8A.
Figure 8C:
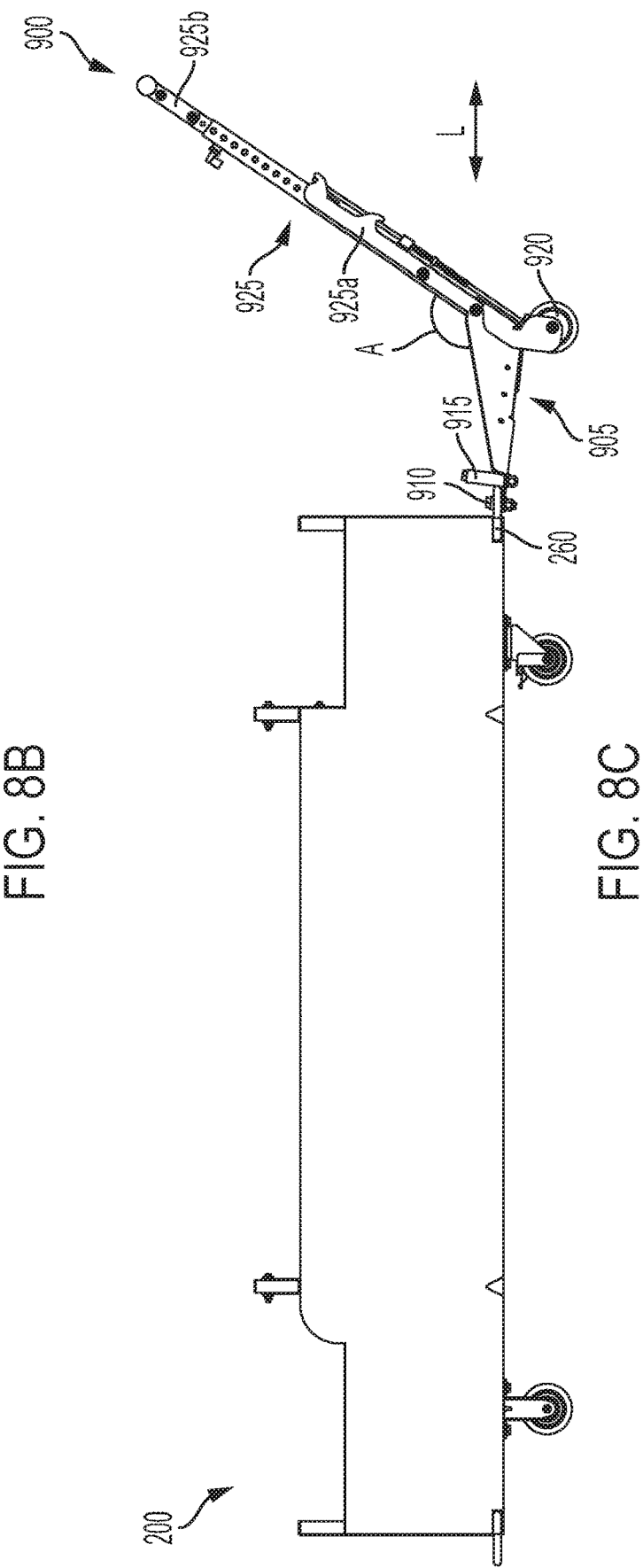
FIG. 8C is a side view of the material handling cart with the pusher depicted in FIG. 8A.

In certain alternative embodiments shown in FIGS. 6A-B, a material handling cart 200 has a frame 205 and wheels 210 similar to cart 100, and also has a floor 201. Floor 201 is formed from steel mesh, such as 1½" #9 flattened expanded steel, and is attached to the upper surface of the frame 205 of cart 200, as by welding. In other embodiments, floor 201 comprises solid steel sheet, perforated steel sheet, aluminum mesh, aluminum sheet, perforated aluminum sheet, etc. When present, the openings in the material selected for floor 201 advantageously allow smaller items to fall through while preventing larger items from falling through. Those of skill in the art will understand that the cart 100 of FIGS. 1-5D can also include a floor similar to floor 201.

Referring again to FIGS. 1-4B, a plurality of engaging members 115, such as steel tubes, are spaced from each other for supporting the part (such as shaft 500) to be carried by the cart 100. Each engaging member 115 is attached to the upper surface 105*a* of the frame 105, as by welding, and has an engaging surface for directly engaging the part 500, which in the embodiment of FIGS. 1-5D is a pair of engaging surfaces 120. The engaging surface(s) 120 comprises a material which protects a corresponding surface of the part from damage when the part is carried by the cart.

In the embodiment of FIGS. 1-4B, each engaging member 115 comprises a saddle 115*a* which is V-shaped, and the engaging surfaces 120 of each of the saddles 115*a* comprises a polymer or a foam, such as Delrin™ polymer available from DuPont de Nemours, Inc. The V-shape of the saddles 115*a* enables the cart 100 to safely accommodate parts of different sizes, such as cylindrical shafts 500 of different diameters, as long as corresponding portions of the shaft 500 to be carried can be supported by the saddles 115*a*.

Figure 4B:
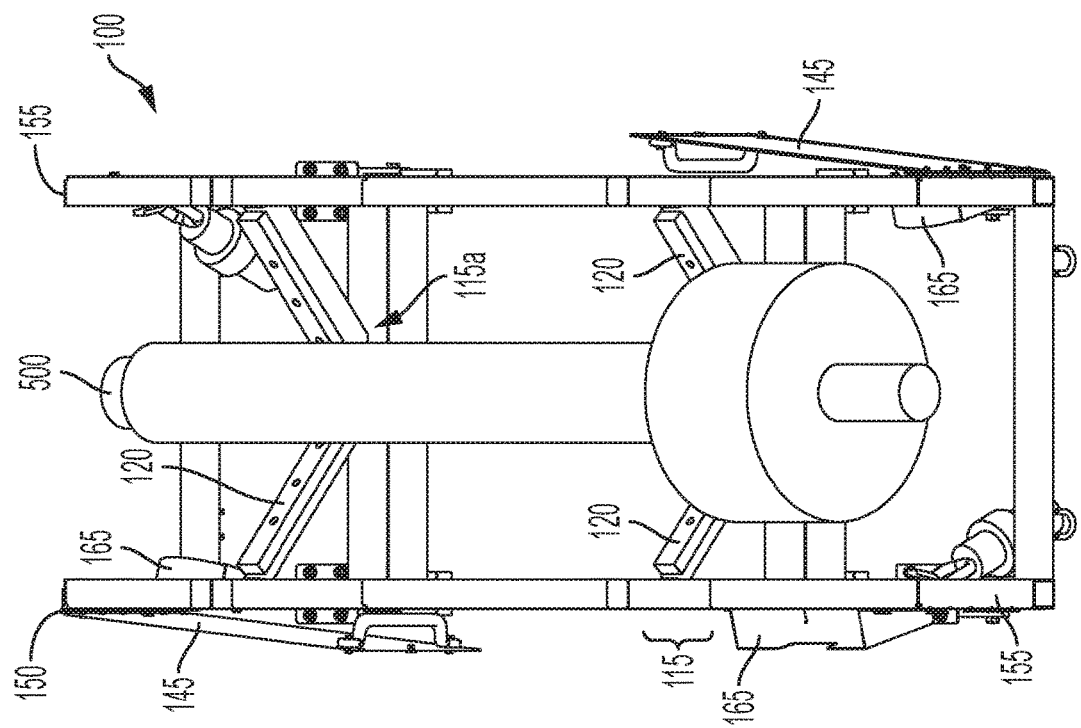
FIGS. 4A and 4B are top perspective views of the material handling cart depicted in FIG. 1 when it is carrying a part.
Figure 4A:
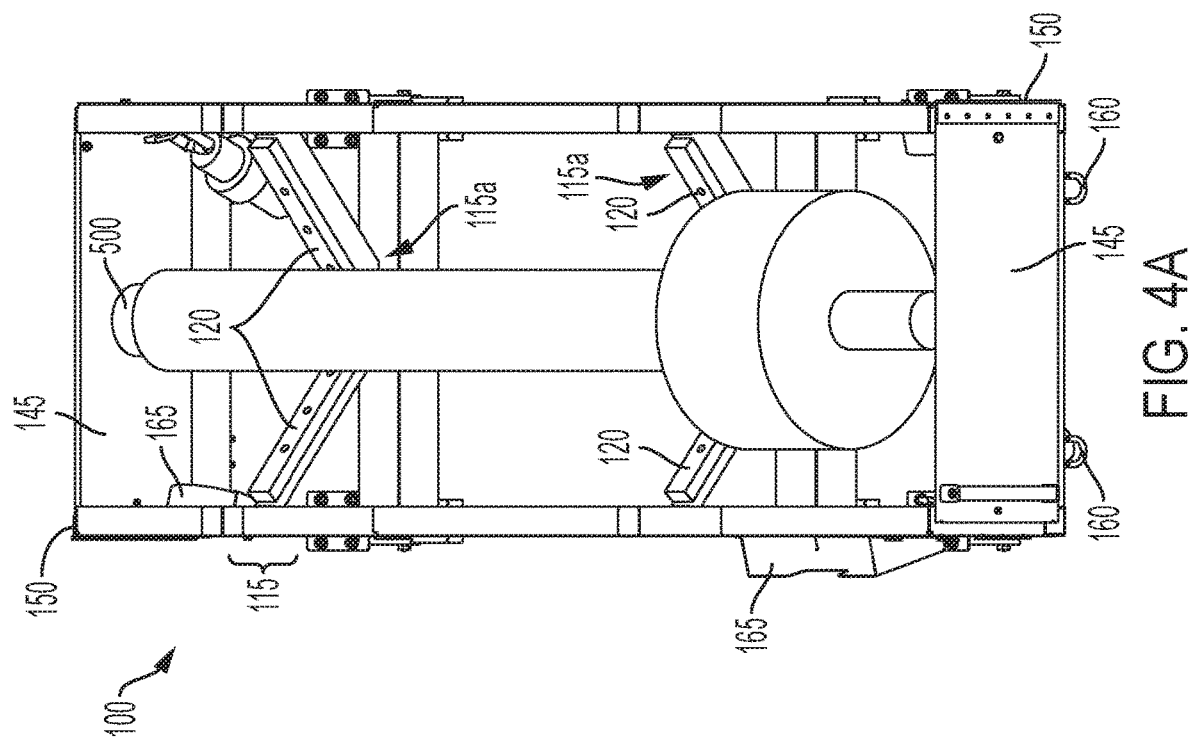
Figure 4C:
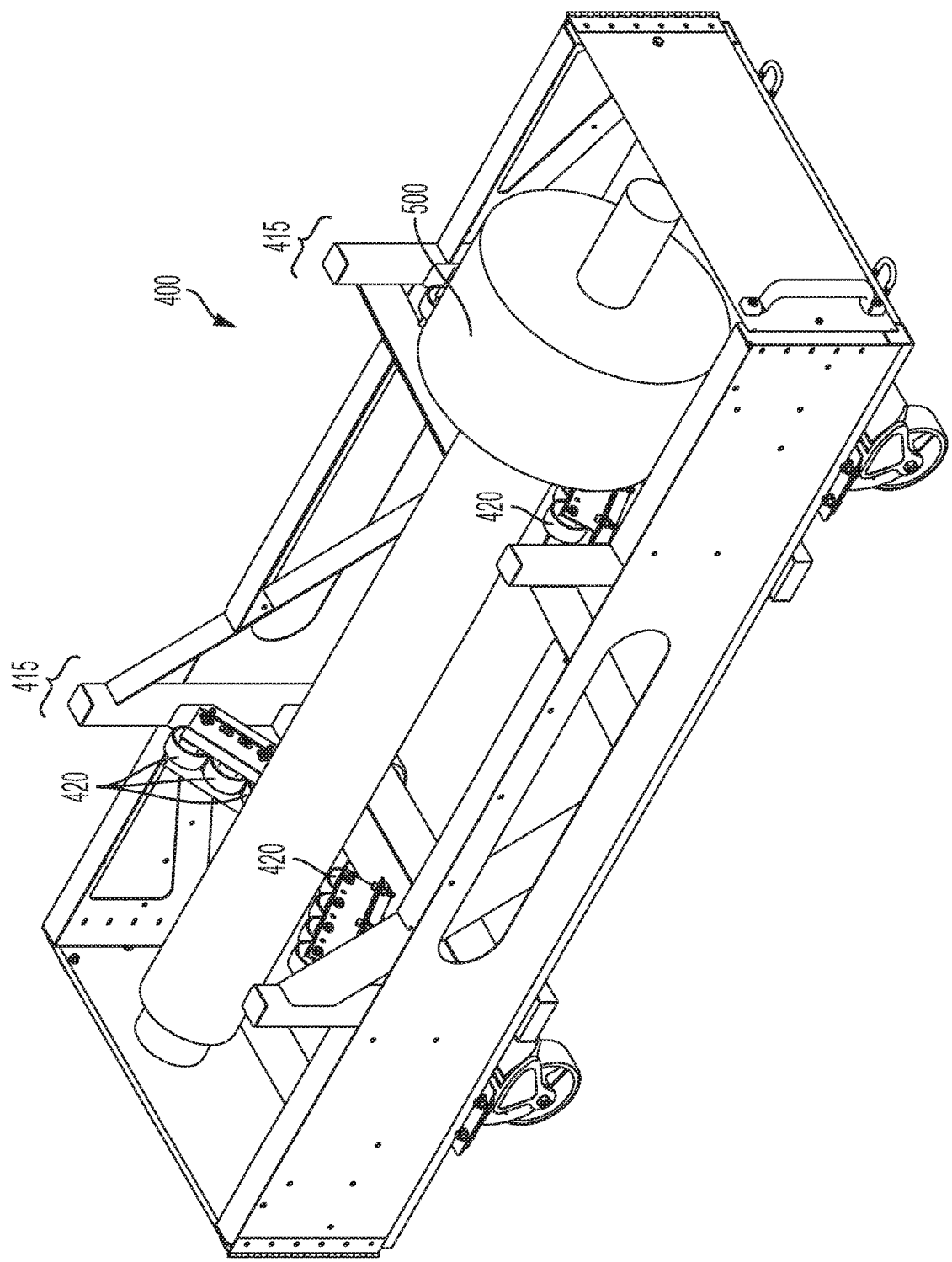
FIGS. 4C-4E are perspective, side, and top views, respectively, of a material handling cart according to another embodiment of the present disclosure.
Figure 4E:
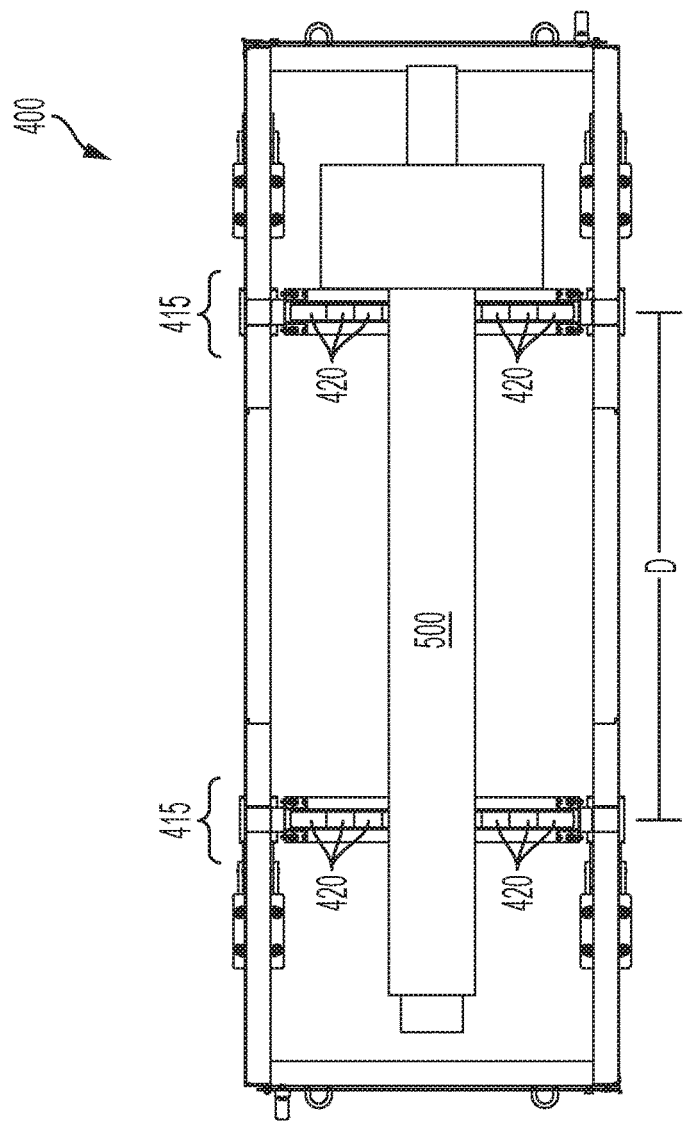
Figure 4D:
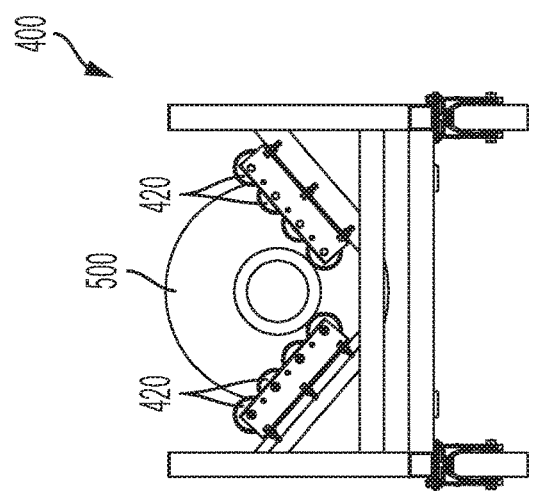
Figure 5C:
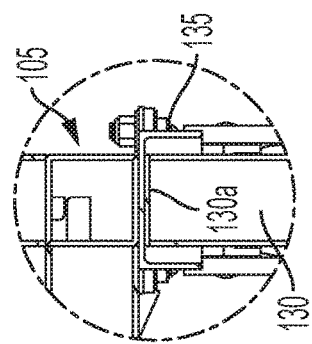
FIG. 5C is an enlarged view of a portion of FIG. 5B.
Figure 5D:
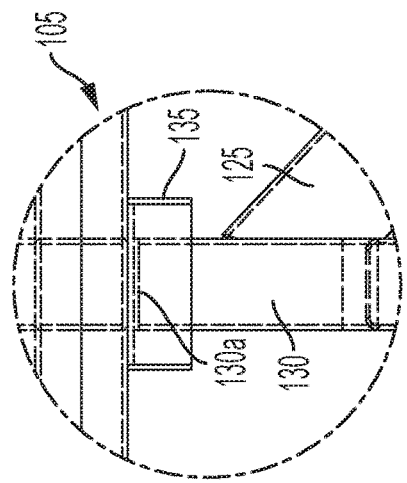
FIG. 5D is a cross-sectional view taken along line 5D-5D in FIG. 5B.
Figure 5B:
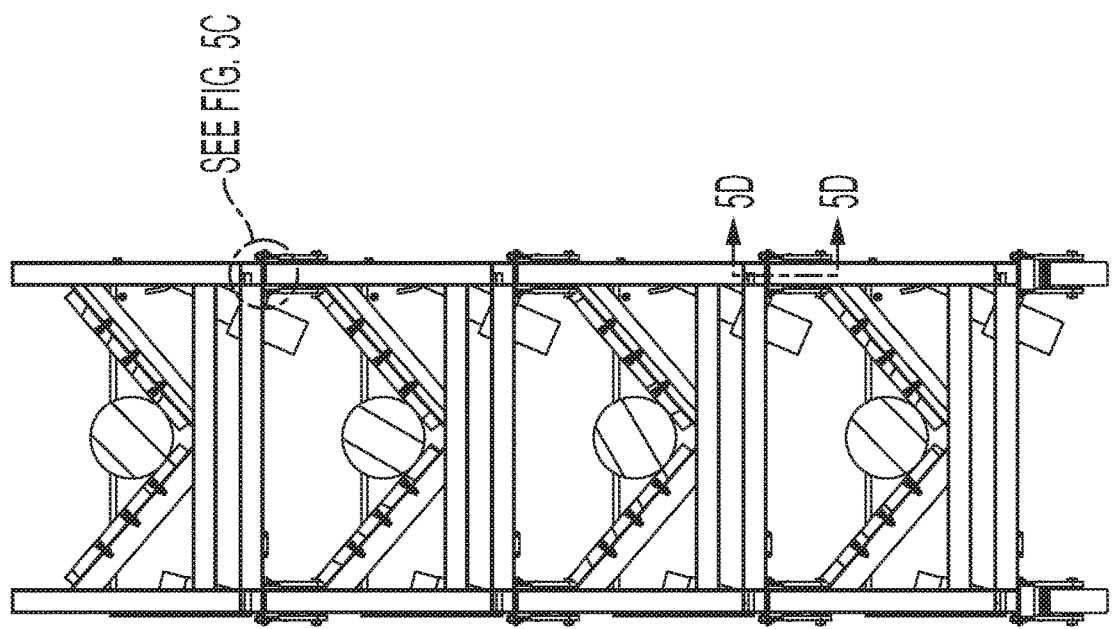
FIG. 5B is a cross-sectional view taken along line 5B-5B in FIG. 5A.

According to an alternative embodiment shown in FIGS. 4C-4E, instead of polymer or foam engaging surfaces 120, a cart 400 has engaging members 415 each comprising one or more opposing pairs of rollers, such as wheels 420, on which a cylindrical shaft portion of the part 500 rests. In the example of FIGS. 4C-4E, each engaging member 415 of cart 400 has four pairs of wheels 420, and engaging members 415 are separated by a distance D of three to four feet. As a result, the part 500 is rotatable when the part 500 is carried by the cart 400, enabling careful inspection of the part 500, painting of the part 500, etc. Wheels 420 are conventional wheels; e.g., similar to caster wheels 110, but having a relatively soft, non-marking tread for contacting the part 500 without damaging its finish. Exemplary wheels include those having rubber, polyurethane, or polyolefin treads and an appropriate load rating, available from Colson Casters of Jonesboro, Ak., USA. Cart 400 can be otherwise similar to cart 100.

In another alternative embodiment shown in FIGS. 6A-8C, cart 200 has engaging members 215 comprising saddles 215*a*, each having a shape substantially complementary to a corresponding portion of a part such as a shaft (not shown) to be carried by the cart 200. This structure limits the size and/or shape of the part that can be carried, but provides a greater surface area of the saddle 215*a* in contact with the part. Engaging members 215 also comprise engaging surfaces 220 comprising a polymer or foam similar to engaging surfaces 120 of cart 100, but conforming to the shape of saddles 215*a*.

It should be understood that a strap or harness can be used to further constrain a part within any of the above-described carts.

A further advantage of the disclosed cart is that a plurality of identical carts can easily be stacked. This enables a number of parts to be safely moved at once, as by rolling the stack of carts. Also, stacking carts saves storage space and increases manufacturing throughput in certain situations. As shown in FIGS. 1-5D, to enable a plurality of the carts 100 to be stacked, each cart 100 includes a plurality of upper supports 115*b* (which are also components of engaging members 115) attached to the frame 105 and extending upward from the frame 105. In this embodiment, the upper supports 115*b* are each a steel tube welded to the frame 105 having a side support 125 that is also steel and welded to the frame. The saddles 115*a* are also attached to the upper supports 115*b*, as by welding. Each upper support 115*b* has a height equal to or greater than a height of the part 500 when the part 500 is carried by the cart 100. Each upper support 115*b* also has a tubular upper stacking coupler 130 at its distal end. In the embodiment of FIGS. 1-5D, upper stacking couplers 130 are each an extension of one of the tubular upper supports 115*b*, and has a cap 130*a* on its end.

Figure 2:
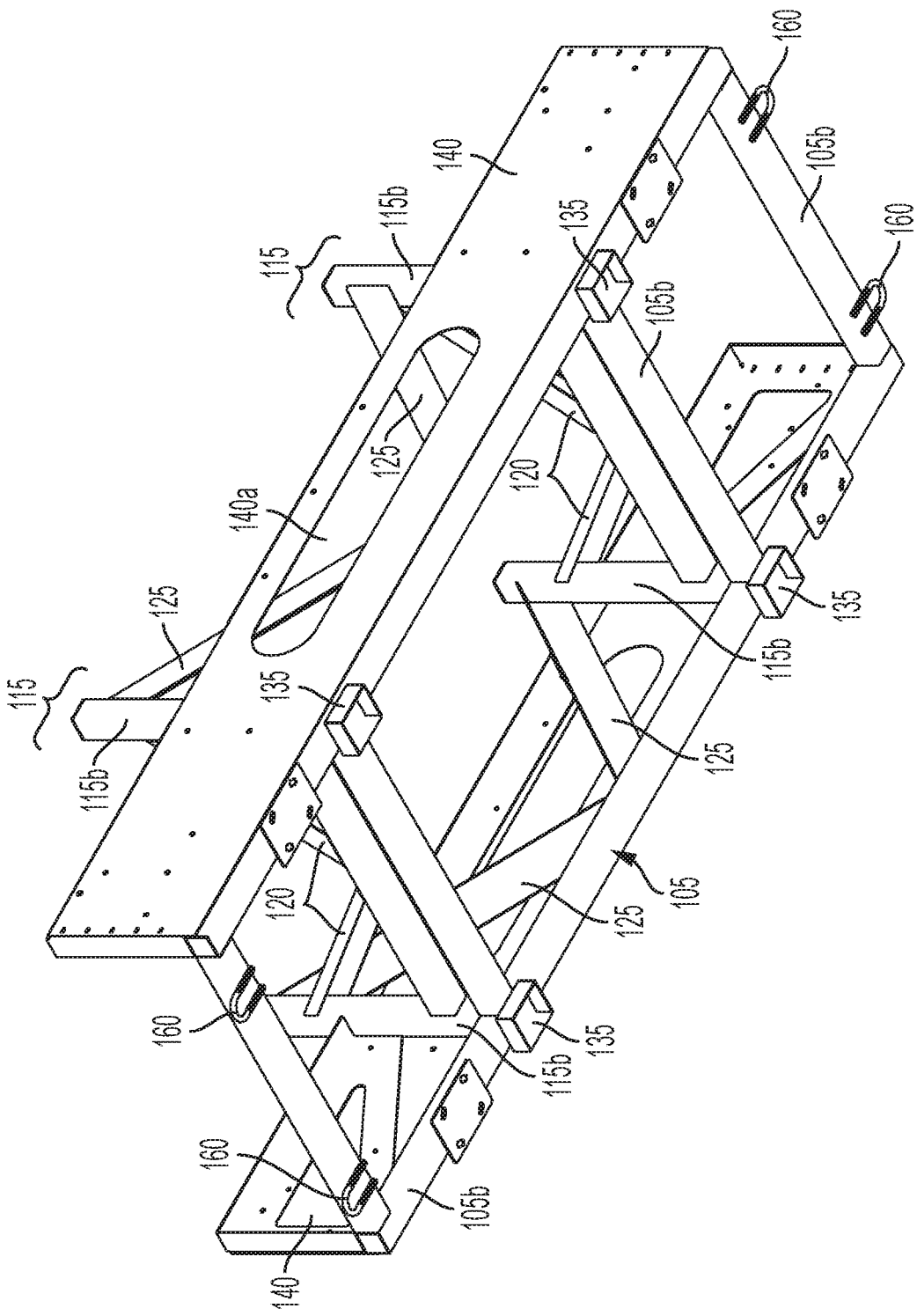
FIG. 2 is a partial perspective view from below of the material handling cart depicted in FIG. 1.

As best seen in FIG. 2, a plurality of lower stacking couplers 135 are attached to the lower surface 105*b* of the frame 105, as by welding. Lower stacking couplers 135 are tubular, and larger in cross-section than the upper stacking couplers 130, such that upper stacking couplers 130 fit into lower stacking couplers 135. Thus, as shown in FIGS. 5A-D, the lower stacking couplers 135 of the cart 100 engage upper stacking couplers of a second material handling cart 100*a* identical to the cart 100, to stack the cart 100 above the second cart 100*a*. Likewise, the upper stacking couplers 130 of the cart 100 engage lower stacking couplers 135 of a third material handling cart 100*b* identical to the cart 100, to stack the third material handling cart 100*b* above the cart 100. A fourth cart 100*c* can also be stacked above 100*b*.

In an alternative embodiment shown in FIGS. 6A-7C, each of the engaging members 215 and a pair of upper supports 215*b* are unitary (i.e., combined into one piece), and the engaging surface 220 of each engaging member 215 extends onto the pair of upper supports 215*b*. Thus, the entire saddle 215*a* and inner portions of the upper supports 215*b* are covered with the material of the engaging member 220 to protect the part from damage. As shown in FIGS. 7A-C, the identical carts 200, 200*a* of this embodiment stack in a similar fashion to the carts 100 and 100*a-c* of FIGS. 5A-D. Upper stacking couplers 230 are disposed at the distal ends of the upper supports 215*b*, and fit into lower stacking couplers 235 having a complementary shape to the ends of the unitary engaging members/upper supports 215/215*b*.

Referring again to FIGS. 1-5A, cart 100 further comprises a plurality of side walls 140 and one or more doors 145, such as steel walls and doors, attached to and extending upward from the frame 105 and surrounding the part 500 when the part 500 is carried by the cart 100. The walls 140 and door(s) 145 provide protection for the part 500. Side walls 140 can include openings 140*a* located and sized such that a user walking by a stack of carts 100-100*c* (as shown in FIG. 5A) is able to easily see whether or not each of the carts is carrying a part 500. In certain embodiments, the one or more doors 145 are movable from a closed position as shown in FIG. 4A, to an open position as shown in FIG. 4B, to provide access to the part 500 (e.g., for inspection of the part 500) when the part 500 is carried by the cart 100. As shown in FIGS. 1, 4A, and 4B, each door 145 has a hinge 150. A magnet 155 or other closure can be provided to hold the door 145 shut. As shown in FIGS. 6A-B, cart 200 also has a set of side walls 240.

A pair of eye bolts or U-bolts 160 (or in other embodiments a pair of hooks) is attached to the lower surface 105b of the frame 105, for pulling the cart 100 by a forklift, or for attaching the cart 100 to another cart, as by chains, and pulling the chained-together carts in a train. Cart 200 of FIGS. 6A-8C also has pairs of eye bolts or U-bolts 260 for the same purpose.

In certain embodiments, cart 100 further includes one or more pockets 165 to hold tools, paperwork, and/or other component(s) associated with the part 500. In these embodiments, cart 100 is a "kit cart" which carries together and organizes all associated elements (i.e., parts, tools, and components). This is advantageous in certain industries, such as the aerospace industry, where elements that need to be assembled to each other may be lost if they are not kept together, thereby causing manufacturing and/or shipping delays.

In other embodiments, cart 100 comprises a conventional radio frequency identification (RFID) tag 170 attached to it. RFID tag can be part of a system for tracking the location of cart 100.

In further embodiments shown in FIGS. 3A-B, 8A-C, and 9A-E, carts 100 and 200 each include a pusher 900 for facilitating moving of the cart 100, 200 within a facility. Cart 100, 200 and pusher 900 are removably attachable to each other as needed. According to these embodiments, at least one of the sides of the cart frame 105, 205 has a pair of spaced-apart first pusher attachments, such as the U-bolts 160, 260 or a pair of holes (not shown) in the frame 105, 205. The pusher 900 comprises a base 905 having a proximal end including a pair of second pusher attachments, each comprising a pin 910 to engage one of the first pusher attachments 160, 260 to movably attach the pusher base 905 to the cart frame 105, 205. The pins 910 extend upwards from the pusher base 905, and are sized to fit within the corresponding first pusher attachment U-bolt 160, 260 or frame hole. A second pin 915 attached to base 905 also contacts the first pusher attachments 160, 260 to stabilize the connection between pusher 900 and cart 100, 200. The pusher base 905 also has a distal end including a pair of wheels 920 mounted to roll along a longitudinal axis L of the base 905 running from its proximal end to the distal end.

The pusher 900 further comprises a handle 925 extending upward from the distal end of the base 905 at an obtuse angle A to the longitudinal axis L of the base 905, such that when the pusher base 905 is attached to the cart frame 105, 205, a user moves the cart 100, 200 by applying a pushing force on the handle 925. The handle 925 is T-shaped and comprises a handle body 925a attached to the pusher base 905, and a handle bar 925b attached to the handle body 925a substantially perpendicular to the handle body 925a. The handle bar 925b is gripped by the user when the user applies the pushing force to the handle 925.

An important advantage of the cart/pusher combinations described herein, such as the combination of cart 100 and pusher 900, is that a low pushing or pulling force is required to move a loaded cart, thereby making it safer for the user. Those of skill in the art will understand that a cart/pusher combination can be designed so that it meets OSHA (Occupational Health and Safety Administration) standards. For example, by selecting appropriately scaled high-quality caster wheels to support the weight of the loaded cart, along with compatible wheels for the pusher, a push/pull force of about 30 pounds is achievable.

Figure 9B:
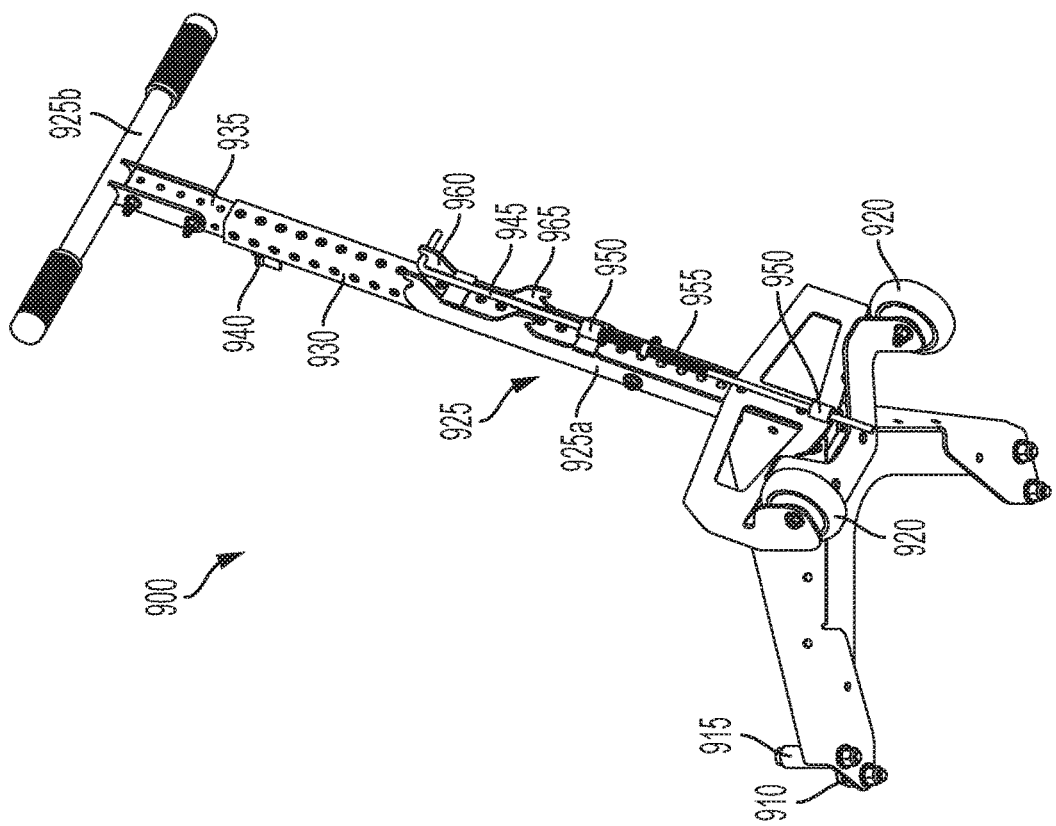
FIGS. 9A and 9B are top and bottom perspective views, respectively, of a pusher usable with the material handling carts disclosed herein, in accordance with an embodiment of the present disclosure.
Figure 9A:
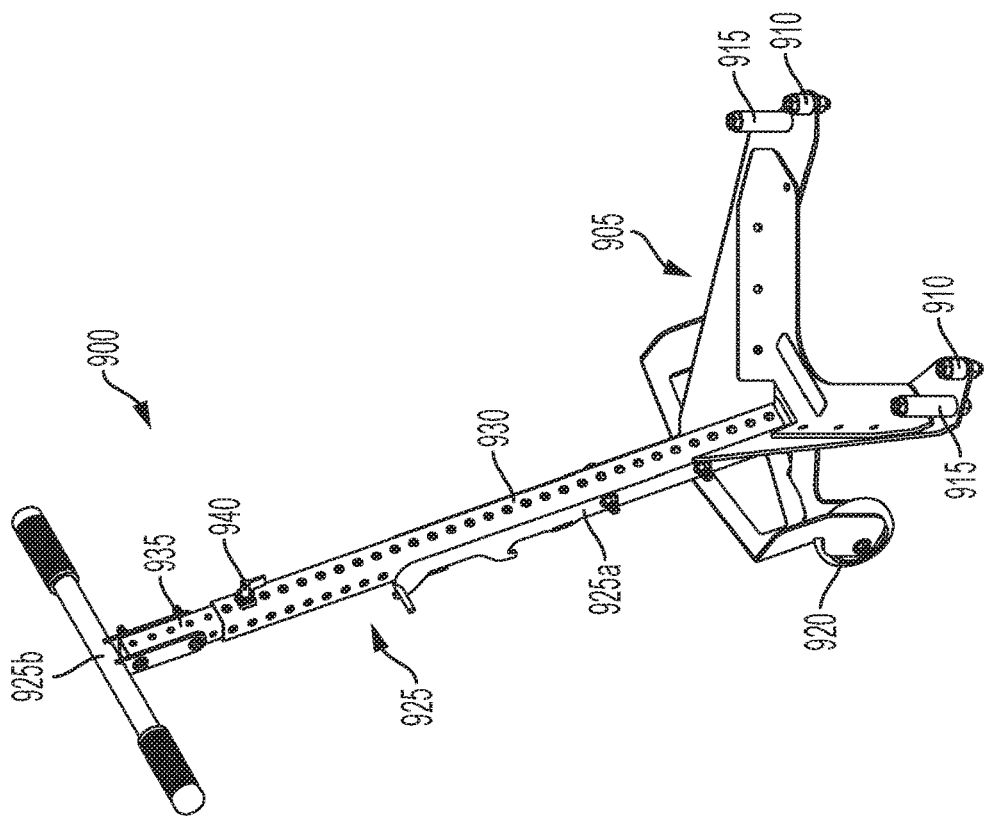
Figure 9D:
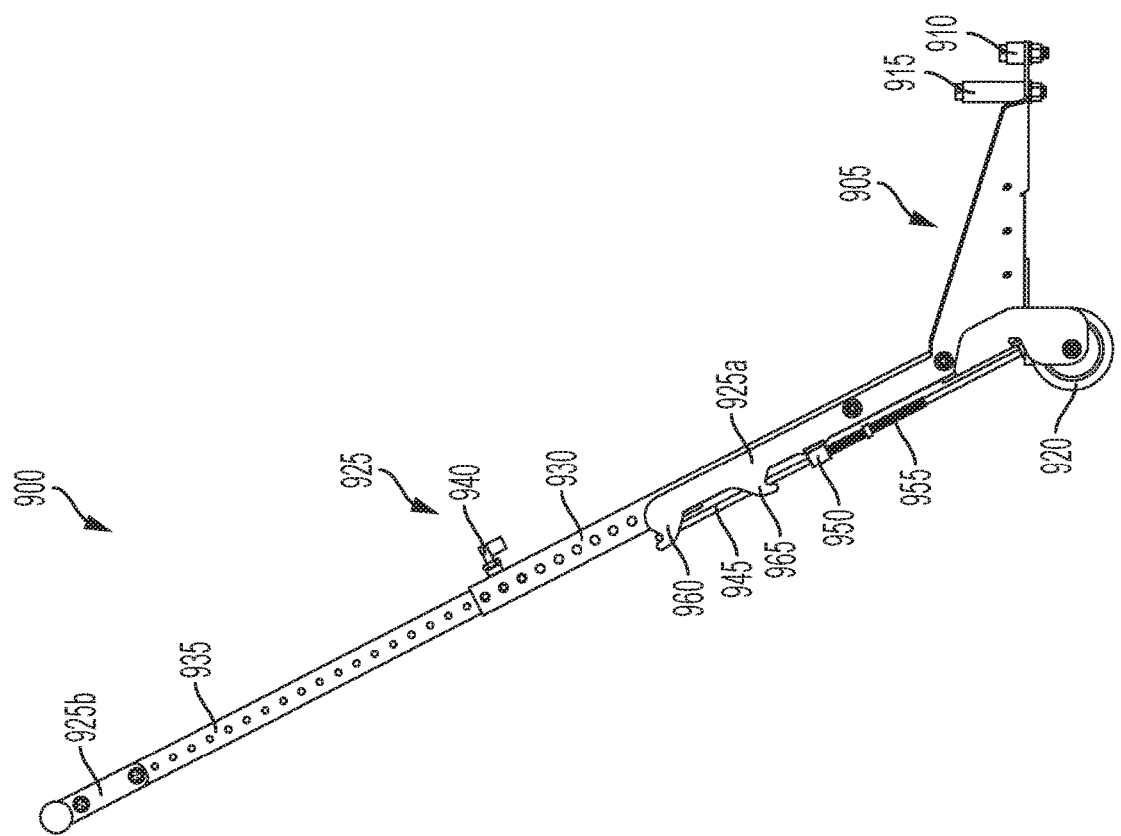
FIGS. 9C-9E are side views of the pusher depicted in FIGS. 9A-B.
Figure 9C:
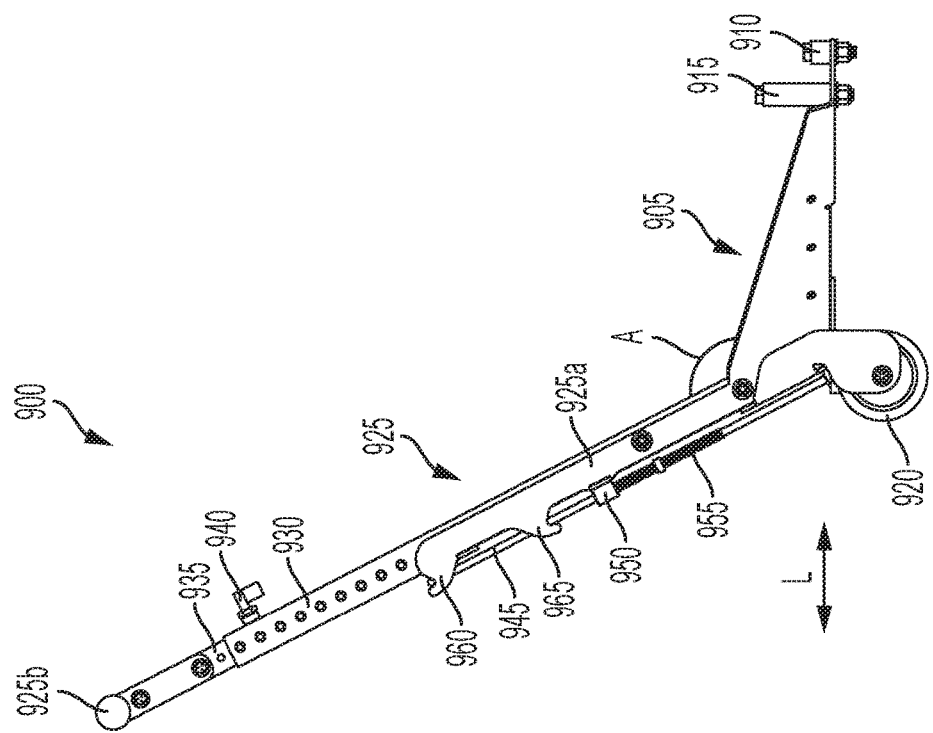

As best seen in FIGS. 9A-E, the handle body 925a comprises a lower tube 930 attached to the pusher base 905, an upper tube 935 that slidably fits inside the lower tube 930, and an adjuster 940, such as a pin or a plunger that extends through holes in the upper and lower tubes 930, 935, to maintain the relative positions of the lower and upper tubes 930, 935 such that the height of the handle 925 is adjustable. For example, FIGS. 9C and 9D show the handle 925 at two extremes of adjustment depending on how upper tube 935 is positioned within lower tube 930. The handle bar 925b is attached to the upper tube 935 substantially perpendicular to the upper tube 935.

Figure 9E:
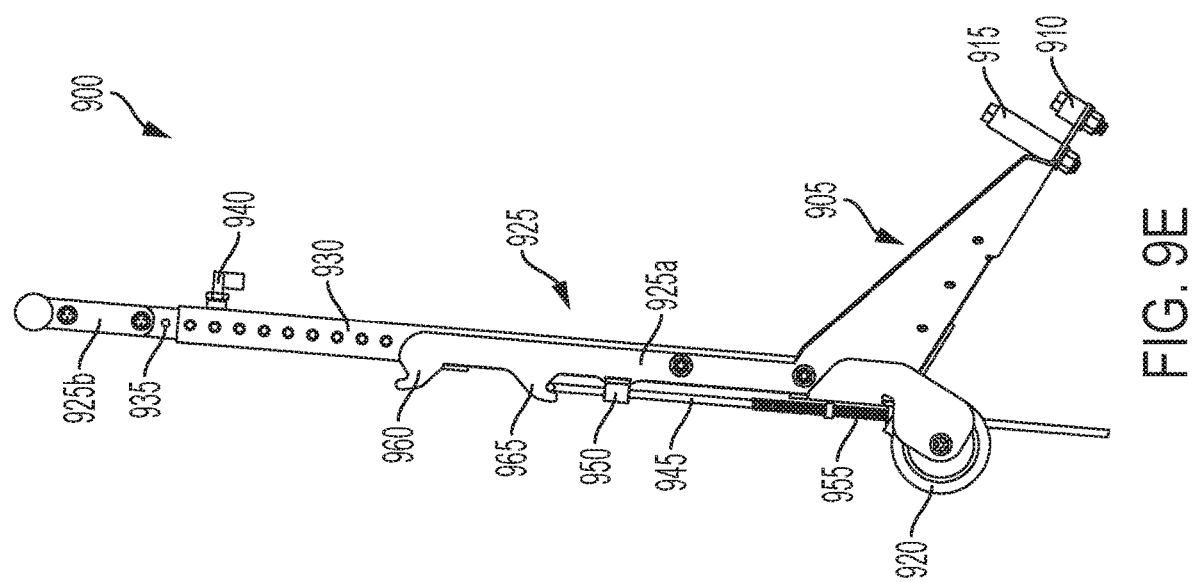

Pusher 900 also includes a stand 945, such as a wire stand, movable from a retracted position shown in FIGS. 9B to 9D, to an extended position shown in FIG. 9E, thereby enabling pusher 900 to stand up and rest on its base 905 when not in use. Stand 945 is slidably mounted by guides 950, and is biased by a spring 955 between the retracted position where the top of stand 945 engages an upper hook 960 of handle body 925a, and the extended position where the top of stand 945 engages a lower hook 965 of handle body 925a.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:
1. A material handling cart, comprising:
a frame including an upper surface and a lower surface;
a plurality of wheels, each wheel attached to the lower surface of the frame;
a plurality of engaging members spaced from each other for supporting a part to be carried by the cart, each engaging member attached to the upper surface of the frame, and having an engaging surface for directly engaging the part, wherein the engaging surface comprises a material which protects a corresponding surface of the part from damage when the part is carried by the cart;
a plurality of upper supports attached to the frame, each upper support extending upward from the frame to a distal end and having a height equal to or greater than a height of the part when the part is carried by the cart, each upper support having an upper stacking coupler at the distal end; and
a plurality of lower stacking couplers attached to the lower surface of the frame;
a plurality of side walls attached to and extending upward from the frame and surrounding the part when the part is carried by the cart;
wherein the lower stacking couplers of the cart engage upper stacking couplers of a second material handling cart identical to the cart, to stack the cart above the second cart; and
wherein the upper stacking couplers of the cart engage lower stacking couplers of a third material handling cart identical to the cart, to stack the third material handling cart above the cart.

2. The material handling cart according to claim 1, comprising a floor attached to the upper surface of the frame.

3. The material handling cart according to claim 1, wherein the plurality of side walls includes a door movable from a closed position to an open position to provide access to the part when the part is carried by the cart.

4. The material handling cart according to claim 1, wherein each engaging member comprises a saddle, and the engaging surface of each of the saddles comprises a polymer or a foam.

5. The material handling cart according to claim 4, wherein the engaging surface of each of the saddles comprises a polymer.

6. The material handling cart according to claim 4, wherein each saddle is substantially V-shaped.

7. The material handling cart according to claim 4, wherein each saddle has a shape substantially complementary to a corresponding portion of the part.

8. The material handling cart according to claim 6, wherein the part has a first portion of a first size, and the saddles support the first portion when the part is carried by the cart;
wherein when the part is not carried by the cart, the saddles support a second portion of a second part which is carried by the cart; and
wherein the first and second portions have different dimensions.

9. The material handling cart according to claim 8, wherein the first portion of the part and the second portion of the second part are cylindrical shafts having different diameters.

10. The material handling cart according to claim 1, wherein a portion of the part engaging the engaging surfaces of the engaging members is a cylindrical shaft, and the engaging members each comprise a pair of rollers on which the cylindrical shaft rests such that the shaft is rotatable when the part is carried by the cart.

11. The material handling cart according to claim 1, wherein one of the engaging members and a pair of the upper supports are unitary, and the engaging surface of the engaging member extends onto the pair of upper supports.

12. The material handling cart according to claim 1, wherein the upper stacking couplers each comprise an upper tube, and the lower stacking couplers each comprise a lower tube, and the lower tubes are larger in cross-section than the upper tubes.

13. The material handling cart according to claim 1, further comprising an eye bolt or a hook attached to the lower surface of the frame, for pulling the cart or for attaching the cart to another cart.

14. The material handling cart according to claim 1, further comprising a pocket for holding a component associated with the part.

15. The material handling cart according to claim 1, wherein the wheels are swivel caster wheels, each having a lock to prevent motion of the wheel.

16. The material handling cart according to claim 1, comprising an RFID tag.

17. The material handling cart of claim 1, wherein the frame has a plurality of sides, and one of the sides has a pair of spaced-apart first pusher attachments, the cart further comprising a pusher, the pusher comprising:
a base having a proximal end including a pair of second pusher attachments which engage the first pusher attachments to movably attach the pusher base to the cart frame, and a distal end including a pair of wheels mounted to roll along a longitudinal axis of the base when the pusher base is attached to the cart frame; and
a handle extending upward from the distal end of the base at an obtuse angle to the longitudinal axis of the base, such that when the pusher base is attached to the cart frame, a user moves the cart by applying a pushing force on the handle.

18. The material handling cart of claim 17, wherein the first pusher attachments each comprise a U-bolt attached to the frame, or a hole in the frame; and
wherein the second pusher attachments each comprise a pin extending upwards from the pusher base and sized to fit within the corresponding first pusher attachment U-bolt or frame hole.

19. The material handling cart of claim 17, wherein the handle is T-shaped and comprises a handle body attached to the pusher base, and a handle bar attached to the handle body substantially perpendicular to the handle body, wherein the handle bar is gripped by the user when the user applies the pushing force to the handle.

20. The material handling cart of claim 19, wherein the handle body comprises a lower tube attached to the pusher base, an upper tube that slidably fits inside the lower tube, and an adjuster to maintain the relative positions of the lower and upper tubes such that the height of the handle is adjustable, wherein the handle bar is attached to the upper tube.

21. The material handling cart of claim 1, wherein each of the side walls comprises an opening disposed to enable a user to visually determine whether or not the cart is carrying the part when the cart, the second cart, and the third cart are stacked.

22. A material handling cart, comprising:
a frame including an upper surface and a lower surface;
a plurality of wheels, each wheel attached to the lower surface of the frame;
a plurality of engaging members spaced from each other for supporting a part to be carried by the cart, each engaging member attached to the upper surface of the frame, and having an engaging surface for directly engaging the part, wherein the engaging surface comprises a material which protects a corresponding surface of the part from damage when the part is carried by the cart;
a plurality of upper supports attached to the frame, each upper support extending upward from the frame to a distal end and having a height equal to or greater than a height of the part when the part is carried by the cart, each upper support having an upper stacking coupler at the distal end; and
a plurality of lower stacking couplers attached to the lower surface of the frame;
a pocket for holding a component associated with the part;
wherein the lower stacking couplers of the cart engage upper stacking couplers of a second material handling cart identical to the cart, to stack the cart above the second cart; and
wherein the upper stacking couplers of the cart engage lower stacking couplers of a third material handling cart identical to the cart, to stack the third material handling cart above the cart.

* * * * *